United States Patent [19]

Taylor

[11] Patent Number: 5,581,353
[45] Date of Patent: Dec. 3, 1996

[54] LASER-BASED MEASUREMENT APPARATUS AND METHOD FOR THE ON-LINE MEASUREMENT OF MULTIPLE CORRUGATED BOARD CHARACTERISTICS

[75] Inventor: Bruce F. Taylor, Worthington, Ohio

[73] Assignee: Qualitek Ltd., Columbus, Ohio

[21] Appl. No.: 389,574

[22] Filed: Feb. 14, 1995

[51] Int. Cl.⁶ .................................................. G01B 11/06
[52] U.S. Cl. ............... 356/381; 250/559.23; 250/559.27; 250/559.45; 356/372; 356/237
[58] Field of Search ...................................... 356/372, 381, 356/237; 250/559.22, 559.23, 559.27, 559.45

[56] References Cited

U.S. PATENT DOCUMENTS 3,671,726  6/1972  Kerr ............................................. 356/381
4,800,286  1/1989  Brears ........................................ 356/372
5,210,593  5/1993  Kramer ...................................... 356/381

*Primary Examiner*—F. L. Evans
*Attorney, Agent, or Firm*—Hale and Dorr

[57] ABSTRACT

The apparatus and method of the present invention utilize a pair of fixed-position laser triangulation sensors, with one sensor located above the board and one directly below. Each sensor produces a measurement signal proportional to the distance between itself and the corrugated board's surface. In one embodiment, the output signal from each sensor is simultaneously processed along two different parallel paths to measure different corrugated board characteristics. A second pair of sensors may be located on the opposite edge of the board. When both board edges are measured, the left and right-edge measurements are averaged to produce a mean value for the board's full width, as well as subtracted from one another to determine the coss-machine gradient.

15 Claims, 10 Drawing Sheets

LASER-BASED MEASUREMENT APPARATUS AND METHOD FOR THE ON-LINE MEASUREMENT OF MULTIPLE CORRUGATED BOARD CHARACTERISTICS

BACKGROUND OF THE INVENTION

The present invention relates to the measurement of corrugated board characteristics and more particularly to an apparatus and method for measuring multiple corrugated board characteristics using laser based sensors.

Corrugated board is formed by bonding, with a starch-based, aqueous glue, one or more layers of paper, called liner, to the outside of one or more fluted paper layers, called medium. The resulting corrugated board is then converted into boxes for the packaging of commercial and industrial products. A typical converting sequence involves printing on the board's external surface using a sheet-fed flexographic printing press, followed by die-cutting to provide the appropriate flaps and slots, and finally, by folding and gluing to form the finished box.

To protect packaged goods from external loads, such as those generated by stacking laden boxes on top of one another, board strength should be maximized for a given board weight. A key predictor of box strength is the board's caliper, which influences its mechanical stiffness. Board caliper also influences print quality, which is affected by the dimensional interference between the printing blanket and the board's surface. Variables such as the flute height, liner thickness, glue application rate, and mechanical loads, are set to produce an application-specific board caliper. Therefore, improper set-up or control can result in a final board that is too thick or thin for its intended purpose. On-line measurement of board caliper will therefore improve board quality and reduce scrap, by more promptly identifying improper operating conditions.

During manufacture the board may be improperly formed, resulting in common, undesirable board flaws such as delaminated regions and crushed or collapsed regions, which typically occur near the board's outer edges (within about 3 inches of the outer edge). Delaminations are the result of inadequate bonding between the board's layers, and may be traced to multiple sources, such as insufficient glue volume, improper temperature during the application of the glue, and insufficient or excessive drying. Board crushing also has multiple causes, such as improperly formed or skipped flutes (which are often caused by misaligned fluting rolls, and are more likely to occur as the speed is increased), as well as contact with contaminants, such as pieces of scrap paper, which when stuck to the surface of rolls or belts comes into loaded contact with the board.

Flawed boards are usually scrapped prior to or during converting, or returned to the board manufacturer for credit, both of which reduce the profitability of the corrugating operation. On-line detection and diagnosis of board flaws will therefore reduce both in-plant scrap and shipment of substandard product, by permitting more prompt problem recognition and resolution.

During manufacture the medium's flute tips are forced against the inside surface of the liner to ensure adequate bonding between the two layers. This contact pressure along the glue-line interface between the two layers causes a slight deformation of the liner, generating a visible pattern of raised lines, which is sometimes referred to as a "washboard" pattern. These undulating flute-ridges may result in a printed image of variable intensity, and, particularly when glossy inks are used, may appear as a series of shiny ridges that obscure the printed image. In addition to bonding loads, there are other process variables that affect the degree of flute-ridging, such as moisture levels which cause paper shrinkage during drying, and sheet tension, which when increased tends to stretch the liner to reduce ridging.

Use of corrugated board for printed consumer packaging is increasing, so more emphasis is being placed on surface flatness. Measuring the amplitude of flute-ridges (defined here as the peak-to-valley value, or the distance from the peak of a flute ridge to the lowest point between it and an adjacent flute ridge) will allow corrugators to grade the board's printability and cull unacceptable product. On-line measurement will also allow corrugators to determine how flute-ridging is affected by complex process changes, perhaps facilitating its closed-loop control.

On-line measurement of caliper and surface roughness, as well as detection of flaws, has been successfully performed in connection with several known sheet-producing applications. For example, caliper measurement, using both contacting and non-contacting means, has been applied to the production of paper since the early 1970's. Flaw detection on papermaking machines has also been successfully used for more than a decade. However, while existing technologies for measuring caliper and surface roughness of paper being manufactured on papermaking machines and for detecting flaws in such paper, could in theory be applied to a corrugating operation, the aggregate cost of a comprehensive solution incorporating existing systems would be prohibitive. Each of the commercially available systems make these measurements through the use of a different sensor technology for each measurement (such as magnetic reluctance for caliper, optical scattering for roughness, and CCD-based imaging for flaws), and each sensor is relatively complex and expensive.

The principle of laser triangulation has also been applied to the scanning measurement of caliper in sheet manufacturing processes, including in papermaking machines. U.S. Pat. No. 5,210,593 describes a scanning, laser-based measurement apparatus that employs the principle of laser triangulation to measure the caliper of a paper web from point to point across its width.

Corrugating plants are traditionally lower margin operations than paper mills, and for this reason, operators of corrugating plants are less able to afford scanning measurement devices. In addition, corrugators are far narrower (typical width is 87 inches) than papermaking machines (whose widths may exceed 400 inches), so their shorter, stiffer cross-machine elements (rolls, drying plates, etc.) do not cause the localized caliper changes that a scanning apparatus is designed to measure. These factors may explain why scanning, laser-based, caliper measurement devices have not been used on corrugators.

It is therefore a principal object of present invention to provide an apparatus and method for on-line measurement of a number of corrugated board characteristics.

It is the further object of the present invention to provide an apparatus and method for on-line measurement of corrugated board characteristics which utilizes a laser-based sensor which has the capability of measuring more than one characteristic.

SUMMARY OF THE INVENTION

The apparatus and method of the present invention measure key characteristics of corrugated board, including caliper (thickness), surface flatness, and board flaws, such as regions where the board has delaminated or been crushed during its manufacture. The apparatus and method use at least one pair of laser triangulation sensors to measure the position of the corrugated board's external, planar surfaces. Each sensor is composed of a laser diode that projects a modulated laser beam onto the surface of the corrugated board, imaging optics that focus the diffusely reflected light into a light spot, and a position-sensitive-detector upon which the light spot finally falls. A change in the position of the board's surface causes a proportional shift in the position of the light spot on the face of the position-sensitive-detector, producing a change in the position-sensitive-detector's electrical output signal. The position-sensitive-detector's output signal is then appropriately converted to derive the dimension between the sensor and the board's surface.

Each sensor's converted output signal is then simultaneously processed along two parallel paths. One processing path combines the output signals from both sensors to determine and monitor the caliper of the board. The second processing path analyzes the output signals of both sensors independently to determine the amplitude of flute-ridges on the surface of the board adjacent a given sensor. The caliper measurement path first adds the distance between the top-side sensor and the top surface of the board, to the distance between the bottom-side sensor and the bottom surface of the board. The resultant sum is then subtracted from the fixed distance between the two sensors to determine the board's caliper. The rate of change of the calculated caliper is then monitored, and successive increases and/or decreases, beyond empirically-defined threshold levels, are taken to indicate the passage and machine-direction length of a board flaw, such as a delaminated or crushed region. As most localized delaminations and crushed regions occur near the edge of the board (within about three inches from the edge), and have a cross-machine width of a few inches or more, locating a fixed sensor pair within about two inches from each edge of the board permits detection of the vast majority (>90%) of common board flaws.

Unlike caliper measurement, flute-ridge measurement does not require the combined analysis of two sensor outputs. The flute-ridge measurement path analyzes the output of a single sensor to determine the amplitude of repetitive, high-frequency (typically 500 to 1,000 Hz) displacements of the board's surface. The output signals from both top-side and bottom-side sensors are independently processed in this manner to determine the amplitude of flute-ridges on both sides of the board. Isolating the flute-ridge amplitude is accomplished by narrow band-pass filtering, using a suitable signal processing technique, such as phase-locking. This technique isolates that component of the fluctuating measured distance between the sensor and the board surface that is oscillating at the known flute-ridge frequency, by filtering-out less repetitive distance variations caused by web flutter, board warp, or longer wavelength caliper changes. The flute-ridge frequency, which is used as the phase-lock reference frequency and which depends upon machine speed, and the tooth-pitch of the fluting rolls that mold the fluted shape into the medium, can be easily monitored.

One pair of sensors may be located on one edge of the corrugated board, and a second pair on the opposite edge of the board. When both board edges are measured, each edge's measurements are first individually processed as described above, then as an additional function, left and right-edge measurements (for caliper and flute-ridge amplitude) are averaged to produced a mean value for the board's full width, as well as subtracted from one another to determine the cross-machine gradient.

These and other objects and features of the present invention will be more fully understood from the following detailed description in which corresponding reference numerals refer to corresponding parts throughout the several views.

DETAILED DESCRIPTION OF THE PREFERRED EMBODIMENTS

Figure 1:
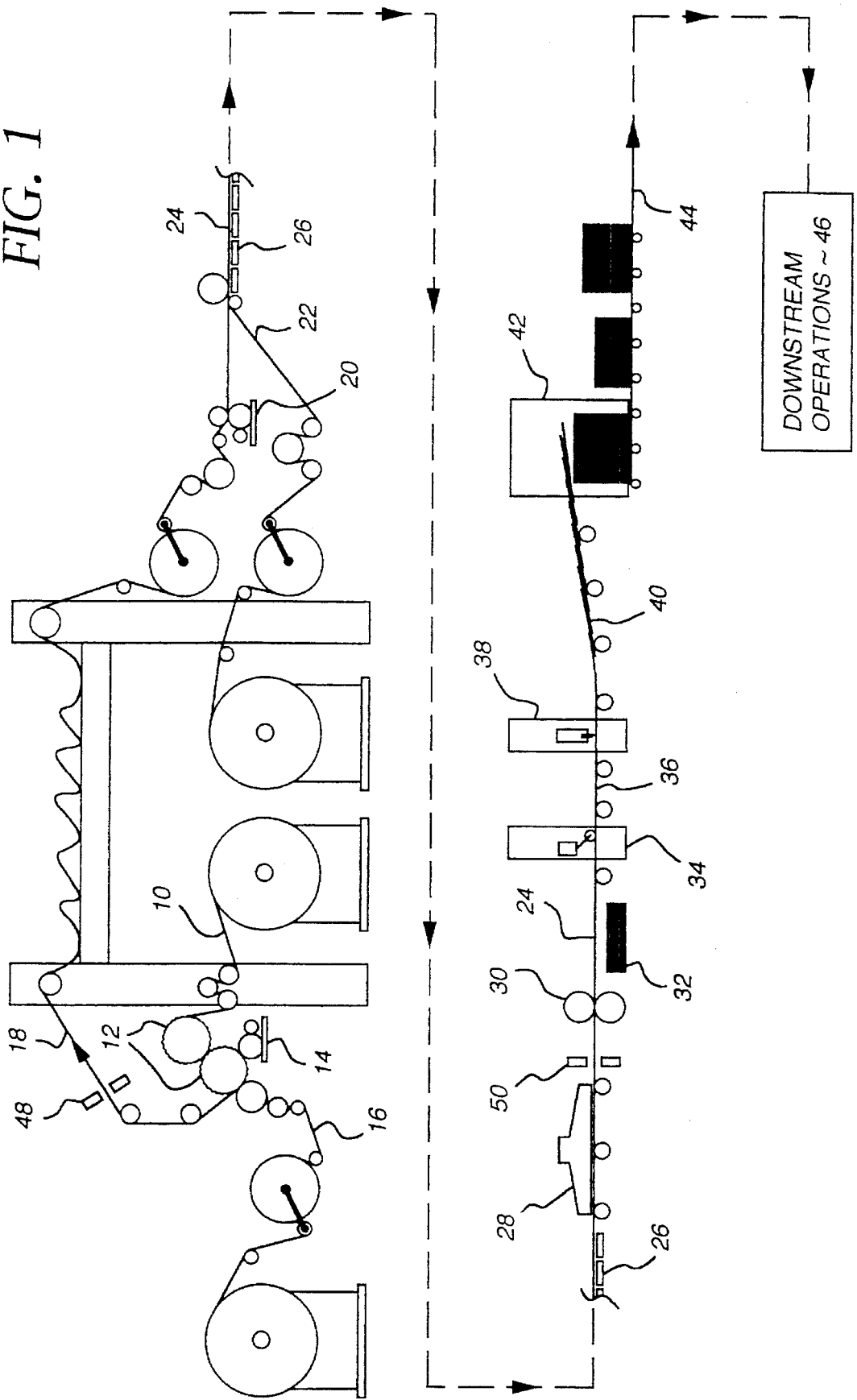
FIG. 1 is a side elevational schematic view of a corrugating machine, showing preferred placements of the sensors of the apparatus of the present invention, as well as the location of relevant corrugating machine components.

Referring now to FIG. 1, corrugated board is manufactured by bonding an outer layer of paper (the liner) to an inner layer of fluted paper 10 (the medium). The medium 10 is first passed between two toothed, heated, fluting rolls 12 which deform it into the desired fluted shape. Glue, consisting primarily of starch and water, is then applied to the top of the medium's flutes by the first glue applicator 14 (typically referred to as the singleface glue applicator), after which it is bonded to the top liner 16 (typically referred to as the singleface liner) to form a composite web 18 (typically referred to as the single-face web). Glue is then applied at the second glue applicator 20 (typically referred to as the glue station) to the bottom of the flutes of the medium 10 before it is finally bonded to the bottom liner 22 (typically referred to as the doubleface liner) to form the corrugated board 24.

After the liners 16, 22 and the medium 10 are joined, the board 24 is dried at elevated temperature(s) in the hot-plate section 26 to set the starch-based glue, and then, depending upon the machine design, the board 24 may pass through a cooling section 28. After leaving the cooling section 28 (or hot-plate section 26 if no cooling section 28 exists), the board 24 then passes through a rotary shear 30 where unacceptable board 32 may be manually chopped-out and dumped onto the floor as rejected board. Board 24 which is not chopped out at the shear 30 then passes through a slitter 34 where a bank of sharp-edged wheels trims the full-width board 24 into narrower, order-dependent slit widths 36. The slit widths 36 then pass through the cut-off knife 38 where they are cut to length to meet order specific requirements. The individual boards 40 are then stacked in a stacker 42 prior to being transported on conveyors 44 to downstream operations 46 such as printing, die-cutting, inventorying, or immediate shipping (if the individual boards 40 are not converted in-house).

Referring now to both FIGS. 1 and 2, the apparatus of the present invention will now be described. The apparatus uses one or more pairs of laser triangulation sensors 52, 54. A pair of sensors 52, 54 would be used to measure the corrugated board 24 (or the singleface web 18 if the pair of sensors 52, 54 is located before the glue station 20) at one specific position across the machine's width. A second pair of sensors 52, 54 would be required to measure the corrugated board 24 (or the singleface web 18) at another location on the machine (either across its width, or along its length).

The following detailed description of the invention shall focus on the measurement of corrugated board 24, which for simplicity sake shall henceforth be referred to as board 24. However, it should be understood that the apparatus and method described below could be applied with negligible modifications to the measurement of a singleface web 18.

Figure 2:
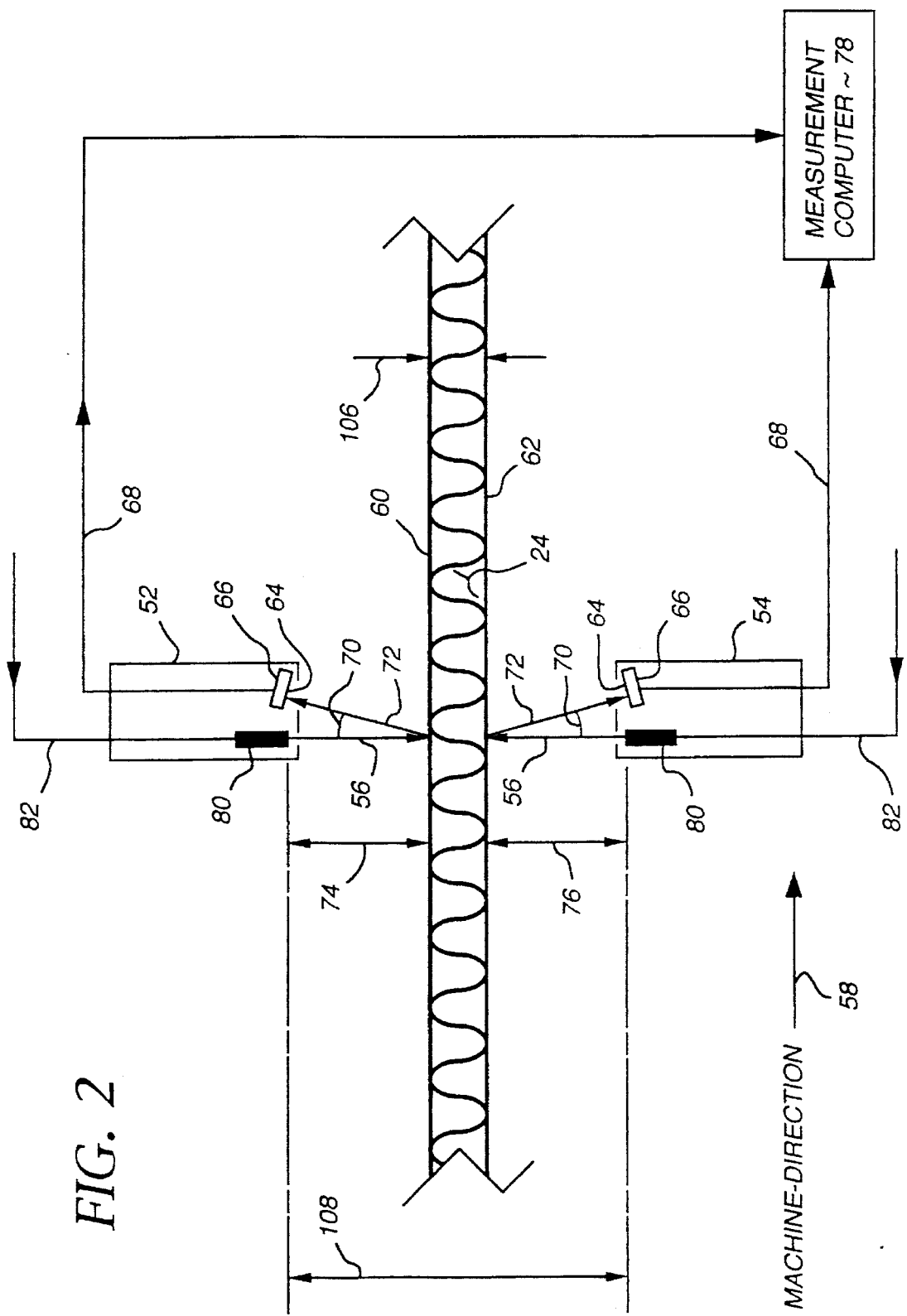
FIG. 2 is a schematic view of a stationary pair of laser triangulation sensors used in the apparatus of the present invention, installed on opposite sides of a corrugated board for the purpose of measuring the position of the board's external, planar surfaces.

Referring now to FIG. 2, a pair of laser triangulation sensors 52, 54 are mounted with one above the board 24 (the top-side sensor 52) and one mounted adjacent to it on the other side of the board 24 (the bottom-side sensor 54). Sensors 52, 54 are mounted such that their laser beams 56 are essentially perpendicular (but not necessarily exactly so) to the machine-direction axis 58. The axis 56 of each of the laser beams 56 of the two sensors 52, 54 are also essentially collinear (but not necessarily exactly so). If the laser beams 56 are not exactly perpendicular to the machine-direction axis 58, and/or the board's surfaces 60 and 62, and/or if they are not exactly collinear (i.e. do not have a common axis, but are offset by some distance), the precision and accuracy of the measurement is reduced.

Each sensor's laser beam 56 is reflected by the board's surface 60 or 62 back upon the surface 64 of a position-sensitive-detector 66 (typically referred to as a PSD). The PSD 66 then generates an electrical output signal 68 whose magnitude is directly proportional to the angle 70 between the effective reflected light path 72 and the laser beam 56, and thus the distances 74, 76 between the sensors 52, 54 and the board's surfaces 60, 62. The output signal 68 from each sensor 52, 54 is then conveyed to a measurement computer 78 for further signal conversion.

Figure 3:
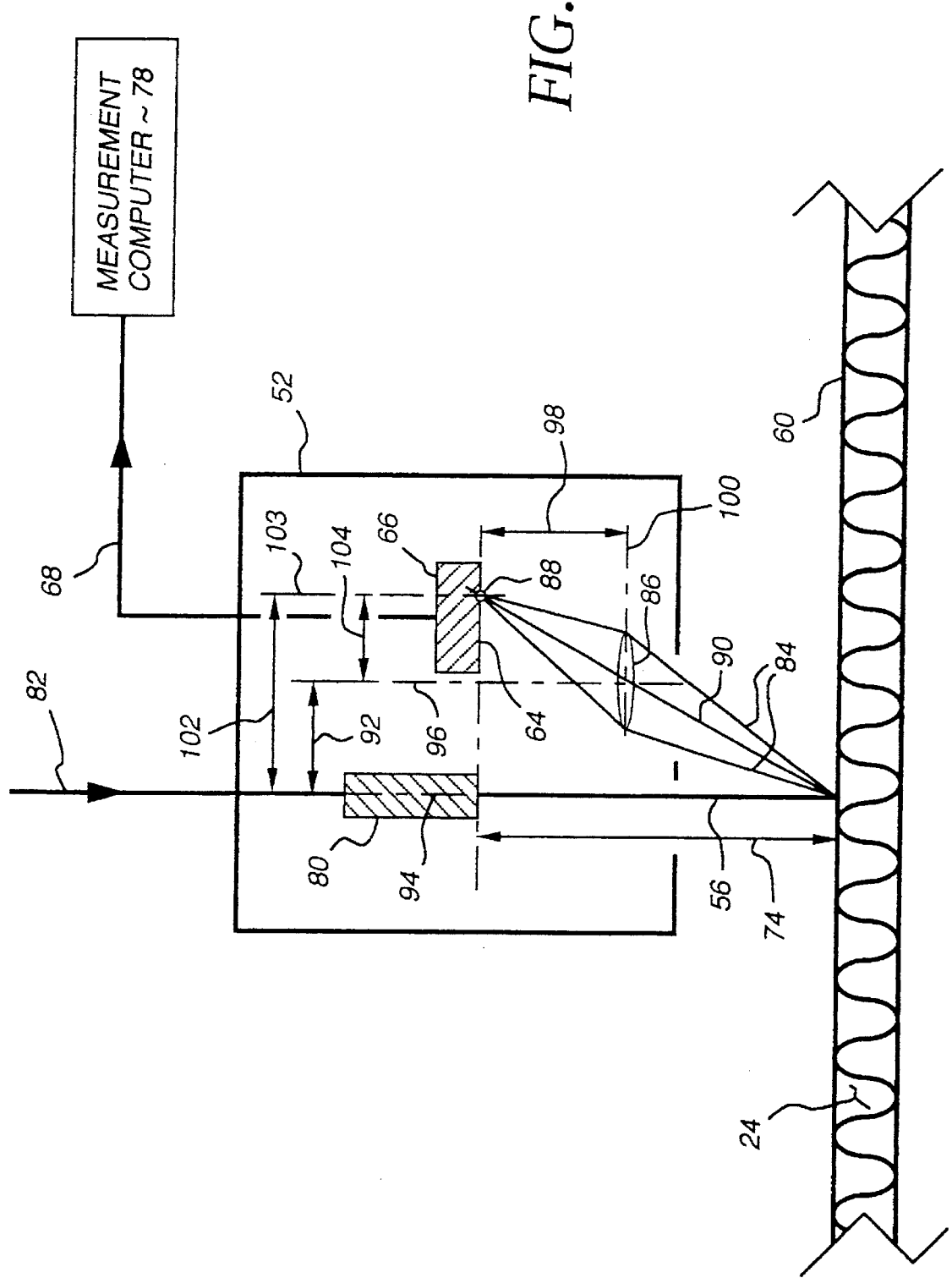
FIG. 3 is a schematic view of a laser triangulation sensor used in the apparatus of the present invention, and the optical geometry pertinent to the measurement of the distance between such sensor and the surface of a corrugated board.

Referring now to both FIGS. 2, 3, each laser triangulation sensor 52 and 54 is of a commercially-available type such as sensors manufactured by Adsens Tech, Incorporated, of La Puente, Calif., TPA Systems b.v., of Maastricht, The Netherlands, or Idec Izumi Corporation, of Osaka, Japan. As described below, in one embodiment of the present invention, the sensors 52, 54 that are used are model LTS 15/3 sensors which are distributed by TPA Systems. Each sensor 52, 54 includes a laser diode 80 which when powered by a suitable power supply 82 generates a modulated laser beam 56 that is projected upon the surface 60 or 62 of the board 24.

The sensors 52, 54 of the present invention could be installed at a number of points along the corrugating process, dependent upon space availability and intended use. When located anywhere after the singleface glue applicator 14, but before the glue station 20, such as at location 48, the present invention would be used to measure the caliper of the singleface web 18, and to detect flaws in the singleface web 18. When located anywhere after the entrance to the hot-plate section 26, but before the cut-off knife 38, such as at location 50, the present invention would be used to measure the caliper and flute-ridge amplitude of the corrugated board 24, as well as to detect flaws in the corrugated board 24.

Referring now to FIG. 3, a more detailed illustration of the top-side sensor 52 will serve to describe the pertinent operating principles of laser triangulation sensors. After the laser beam 56 illuminates the board's surface 60, it is converted into diffuse reflected light 84 that reflects back upon a set of imaging optics 86, or lenses. The imaging optics 86 then focus the diffuse reflected light 84 into a spot image 88 that falls upon the face 64 of a PSD 66, which is located directly behind the imaging optics 86. The axis 94 of the laser beam 56 and the effective axis 90 of the diffuse reflected light 84 form a triangle whose angles are dependent upon the variable distance 74 between the laser diode 80 and the board's surface 60, as well as the fixed dimensional layout of the sensor's internal components. The third side of the triangle is a line through the face of the sensor 52 and PSD 66.

Critical internal dimensions include the distance 92 between the axis 94 of the laser diode 80 and the axis 96 of the imaging optics 86, and the distance 98 between the perpendicular axis 100 of the imaging optics 86 and the face 64 of the PSD 66. The variable distance 74 from the laser diode 80 to the board's surface 60, and the variable distance 102 from the axis 94 of the laser diode 80 to the axis 103 through the location of the spot image 88 on the face 64 of the PSD 66, form an optical triangle whose angles are identical to those of the triangle formed by the fixed distance 98 between the perpendicular axis 100 of the imaging optics 86 and the face 64 of the PSD 66, and the variable distance 104 between the axis 96 of the imaging optics 86 and axis 103 through the location of the spot image 88 on the face 64 of the PSD 66. One triangle is defined by the variable dimensions 74 and 102 (which is the sum of the fixed dimension 92, and the variable dimension 104). The third side of this triangle is of course the line 90. The second, and similar triangle is defined by the fixed dimension 98, and the variable dimension 104. The third side of this smaller triangle is also formed by line 90. The variable dimension 74 can thus be calculated when the variable dimension 104 is known. If the variable dimension 74 is given the variable name "B", the dimension 98 is given the variable name "C", the dimension 92 is given the variable name "D", and the dimension 104 is given the variable name "E", then the distance 74 can be calculated using the following formula;

$$B = C \times (D+E)/E.$$

This simple trigonometric relationship allows the distance 74 between the laser diode 80 and the board's surface 60 to be calculated from the sensed position of the spot image 88 on the face 64 of the PSD 66.

The PSD 66 is a photodiode with two current outputs, the ratio of one to the other being proportional to the distance 104, which depends upon the position of the spot image 88 on the face 64 of the PSD 66. If the surface 60 of the board 24 is located at the designed focal point of the optical system, the spot image 88 will be located in the center of the face 64 of the PSD 66, and the ratio of the two current outputs will be equal to unity. If the distance 74 between the board's surface 60 of board 24 and the laser diode 80 changes, the spot image 88 will move left or right of the center of the PSD 66, causing the ratio of the two currents to increase or decrease. The sensor output signal 68, which is the ratio of these two currents, is then converted into a distance measurement 74 by the measurement computer 78, using a signal conversion routine that is based upon the trigonometric relationships described above.

The laser triangulation sensor 52 described above uses one (1) laser diode 80 and one (1) position-sensitive-detector (PSD) 66, and may be referred to as a single-detector sensor. A laser triangulation sensor 52 that uses one (1) laser diode 80 and two (2) position-sensitive-detectors (PSDs) 66, which may be referred to as a twin-detector sensor, may also be used to measure the distance 74 between the sensor 52 and the board's surface 60. The operating principle of a twin-detector sensor is very similar to that of a single-detector sensor. In a twin-detector sensor one PSD 66 is located on either side of the axis 94 of the laser diode 80, and each PSD 66 is located essentially the same perpendicular distance from the axis 94 of the laser diode 80, such that the intensity of the reflected light 84 falling upon each PSD 66 is approximately equal. Each PSD 66 in a twin-detector sensor has two current outputs, with the ratio of one current output to the other being proportional to the distance 74 between the sensor 52 and the surface 60 to be measured. While the ratio of either PSD's two current outputs may be used to determine the distance 74, the current ratios generated by both PSDs 66 may be combined in a suitable manner, for example by averaging them, to provide a more accurate measurement of distance 74. Averaging the current ratios of two (2) PSDs 66 provides a less noisy measurement of distance 74 which is less sensitive to the slope or incline of a surface 60 to be measured. The preferred laser triangulation sensor, which is the model LTS 15/3 sensor distributed by TPA Systems of Maastricht, The Netherlands, is such a twin-detector sensor.

Referring again to FIG. 2, to measure the board's caliper 106 the output signal 68 from each sensor 52 or 54 is first converted into a measurement of the distance 72 or 74 between the sensor 52 or 54 and the board surface 60 or 62 adjacent to it. The measured top-side distance 74 is then added to the measured bottom-side distance 76 by the measurement computer 78, after which the sum is subtracted from the fixed, known distance 108 between the two sensor's 52, 54, to derive the caliper 106 of the intervening board 24.

Figure 4:
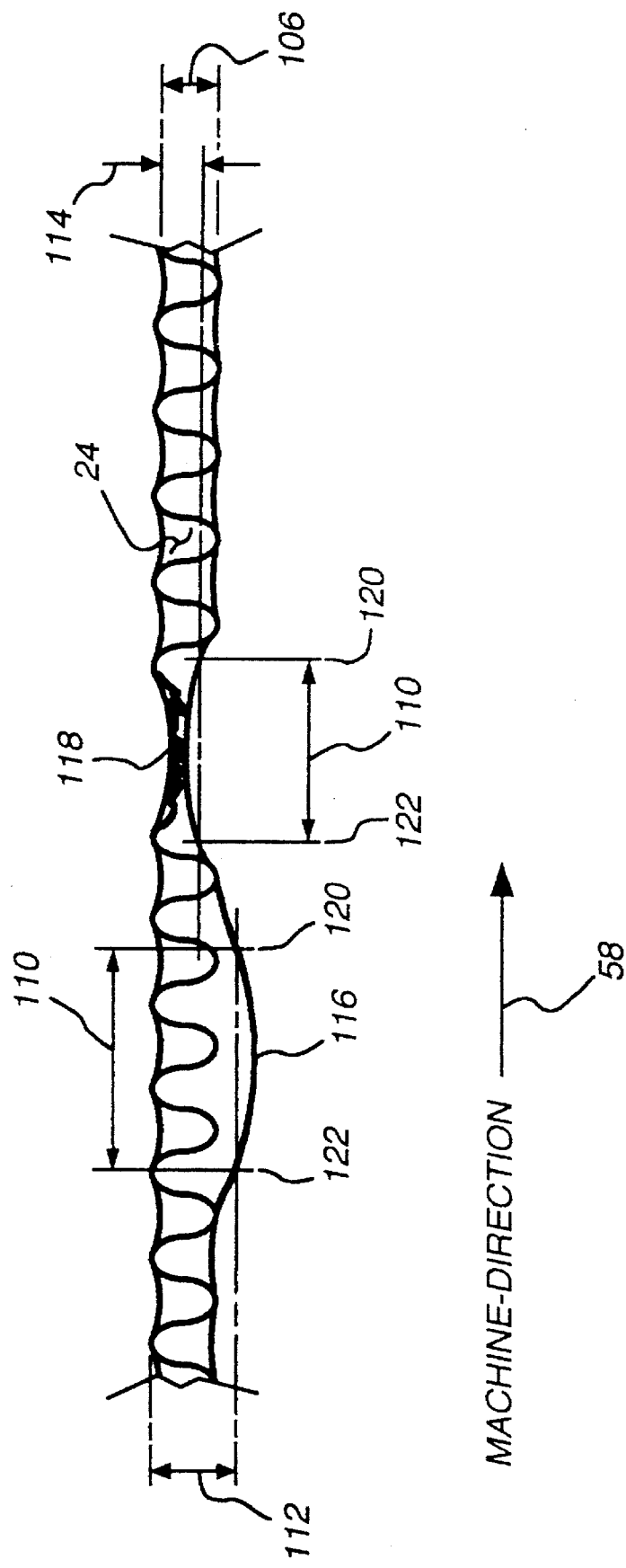
FIG. 4 is a side elevational view of a segment of corrugated board having common board flaws.

Referring now to FIG. 4, to detect the passage and machine-direction length 110 of a board flaw the measured caliper 106 is monitored to identify abrupt excursions beyond empirically-determined thresholds 112, 114. For instance, a corrugated board producer might decide that a board 24 of acceptable quality should not exhibit an abrupt change in measured caliper 106 of more than plus or minus 0.0075 inches (i.e.+/−5% of a nominal 0.15 inch board caliper). This producer might also wish to define an abrupt change as one that occurs within the machine-direction 58 passage of 10 feet of board, which would be equivalent to an elapsed time of 0.6 seconds when the machine speed is 1000 feet/minute. For this example, a change in measured caliper 106 of plus or minus 0.020 inches during the machine-direction 58 passage of 0.1 inches of board 24 (equivalent to an elapsed time of 0.5 milliseconds with a board 24 that is moving at 1000 feet/minute) would identify a section of board 24 that is of unacceptable quality. Such an abrupt change in measured caliper 106 would be indicative of common board flaws such as delaminated regions 116 or crushed regions 118. A delaminated region 116 would appear as a significant, abrupt increase in measured caliper 106 above a high thickness threshold 112, while a crushed region 118 would appear as a significant, abrupt reduction in measured caliper 106 below a low thickness threshold 114. While the initial abrupt change in measured caliper 106 would identify the leading-edge 120 of a flaw, an abrupt return to close to the originally measured caliper 106 would identify the trailing-edge 122 of the same flaw. The elapsed time between the leading-edge 120 and trailing-edge 122 detections would be divided by the machine speed to calculate the machine-direction length 110 of the flaw. For example, if the elapsed time between leading-edge 120 and trailing-edge 122 detections is 10 milliseconds, and the board 24 is moving at 1000 feet/minute, then the calculated machine-direction flaw length 110 would be 2 inches.

Figure 5:
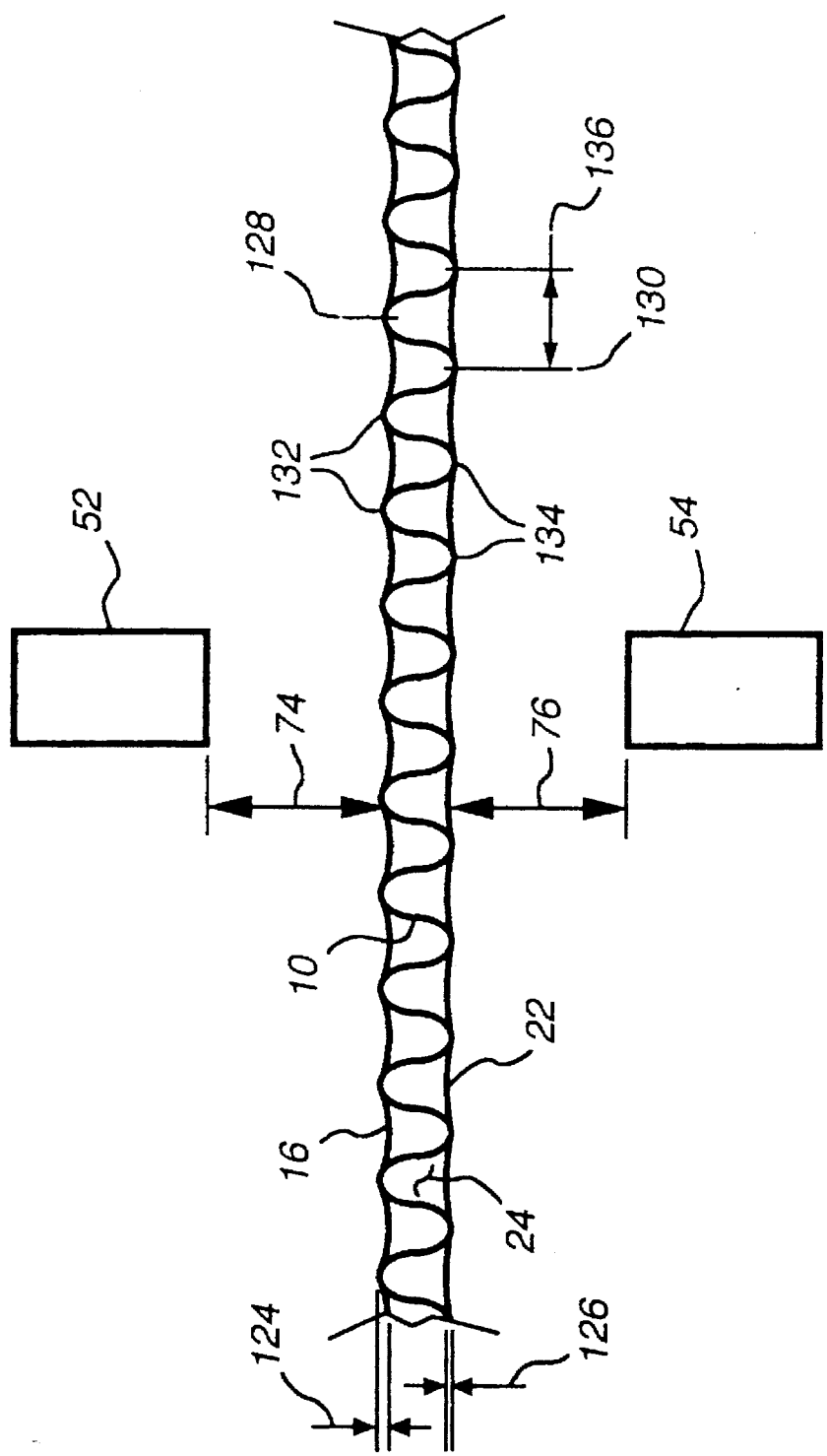
FIG. 5 is a side elevational view of a segment of corrugated board, showing flute-ridges and the measurement scale applicable to such flute-ridges.
Figure 6:
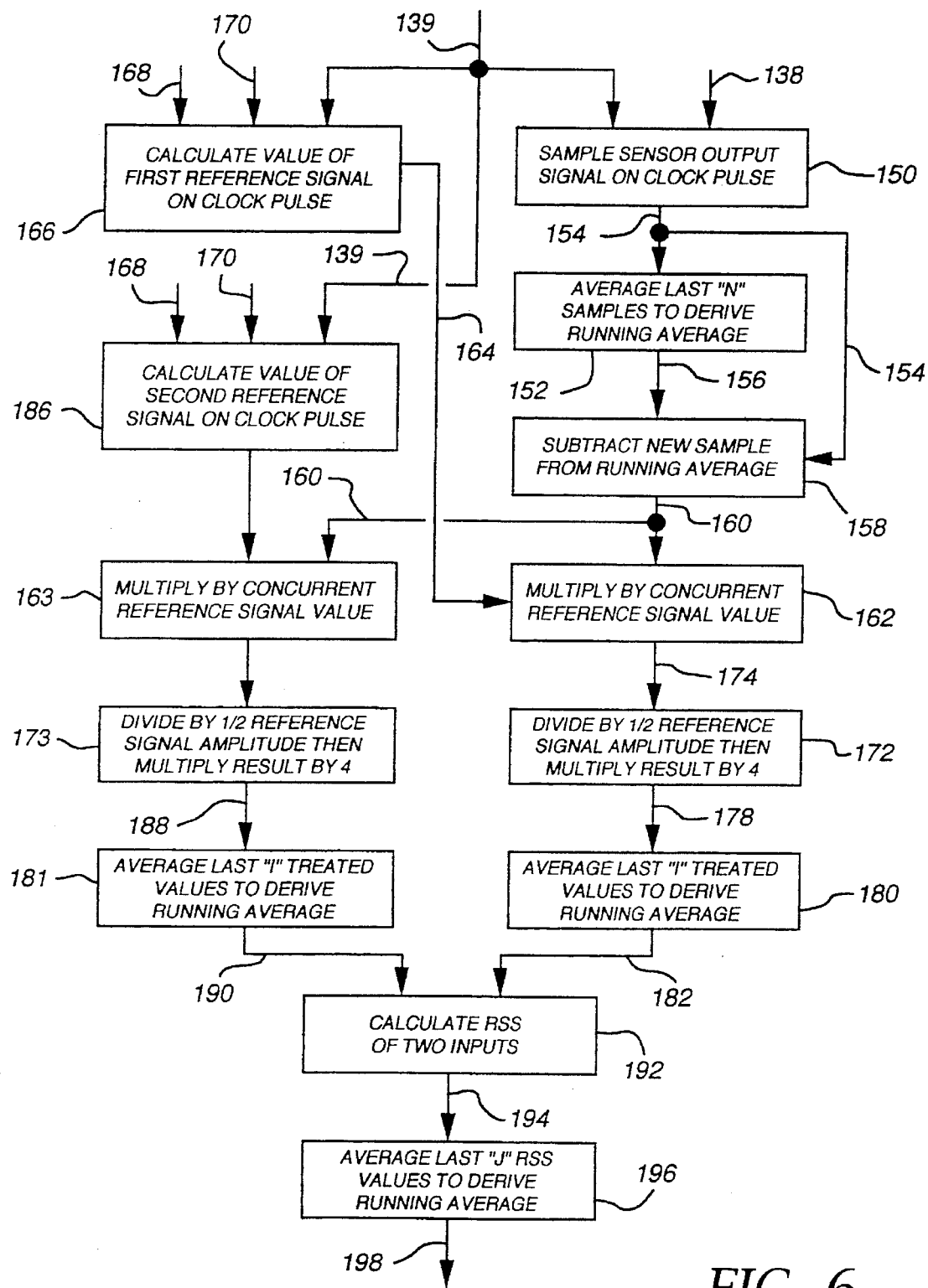
FIG. 6 is a flow chart of the steps performed by the apparatus and method of the present invention to determine the amplitude (peak-to-valley value) of that component of a sensor output signal that is fluctuating at the flute-ridge frequency.

Referring now to FIGS. 1 and 5, the top-side sensor 52 is also used to measure the top-side flute-ridge amplitude 124, while the bottom-side sensor 54 is also used to measure the bottom-side flute-ridge amplitude 126. The fluted medium 10 contacts the top liner 16 at the top-side glue lines 128, and the bottom liner 22 at the bottom-side glue lines 130. External loading during the gluing and drying processes, plus shrinkage of the liners 16, 22 as they dry, generates flute-ridges 132, 134 in the liners 16, 22 which occur at the glue-line interval 136. The variable distances 74, 76 between the sensors 52, 54 and the surfaces 60, 62 of the moving board 24, therefore include fluctuating components with amplitudes 124, 126, which are equal to the depths of the flute-ridges 132, 134, and which occur at the flute-ridge frequency. The flute-ridge frequency is a simple function of the machine speed and the glue-line interval 136 (which is equal to the pitch of the teeth on the fluting rolls 12). For example, if the glue-line interval 136 is 0.2 inches, and the machine speed is 1000 feet/minute, then the flute-ridges 132, 134 will pass by the sensors 52, 54 at the rate of 1,000 flute-ridges/second (i.e. 1000 ×12/(60×0.20)=1,000 Hz).

The repeatable distance fluctuations caused by the passage of flute-ridges 132, 134 are superimposed upon typically larger, more random distance variations caused by board flutter, board warp, or longer wavelength caliper changes. Differentiating the flute-ridge amplitudes 124, 126 from background caliper and/or flutter variations is accomplished by a suitable band-pass filtering procedure, which reliably isolates those components of the sensor output signals that are fluctuating at the flute-ridge frequency. Variations of a common signal processing technique referred to as phase-locking are preferred for this purpose.

Referring to FIG. 6 and FIGS. 7a through 7i, a particular implementation of the preferred phase-locking technique will now be described. It should be understood that alternative analytic methods could be employed without altering the end result or the nature of the present invention. One particular implementation of the preferred phase-locking method may be demonstrated by the treatment of a representative sensor output signal 138 (FIG. 6 and 7a) and the graphical representation of each step in the analytic process. The sensor output signal 138 used in this example comprises three sinusoidal components, a low-frequency component 140 (FIG. 7b) which is representative of caliper variations, a medium-frequency component 142 (FIG. 7c) which is representative of board flutter, and a high-frequency component 144 (FIG. 7d) which is representative of the flute-ridges whose amplitude 146 (FIG. 7d) is to be determined.

To add to the realism of the example the low-frequency component 140 is given a significant offset from zero (2000 mils), which is representative of the sensor output signal's DC component due to the nominal distance between the sensor and surface of the board.

In a typical application a pair of laser triangulation sensors will be located about four to six inches apart, hence each sensor might be located roughly 2 inches, or 2000 mils from the board's respective adjacent surface. It should be noted that the scale used for the y-axis (i.e. the ordinate) of the graphs FIG. 7*a* through FIG. 7*i* is in mils, or thousandths of an inch. To demonstrate the phase-locking technique, the frequency of the reference signal 148 (FIG. 7*f*) is set equal to the frequency of the high-frequency component 144, which would equal the known flute-ridge frequency in a realistic application. The objective of this example is thus to determine the otherwise unknown amplitude 146 of the high-frequency component 144. The flute-ridge amplitude 146 (the peak-to-valley value) in this example is set to 3 mils, which is representative of the flute-ridge amplitude 146 observed on typical corrugated boards (which is normally between 1 and 5 mils).

Figure 7A:
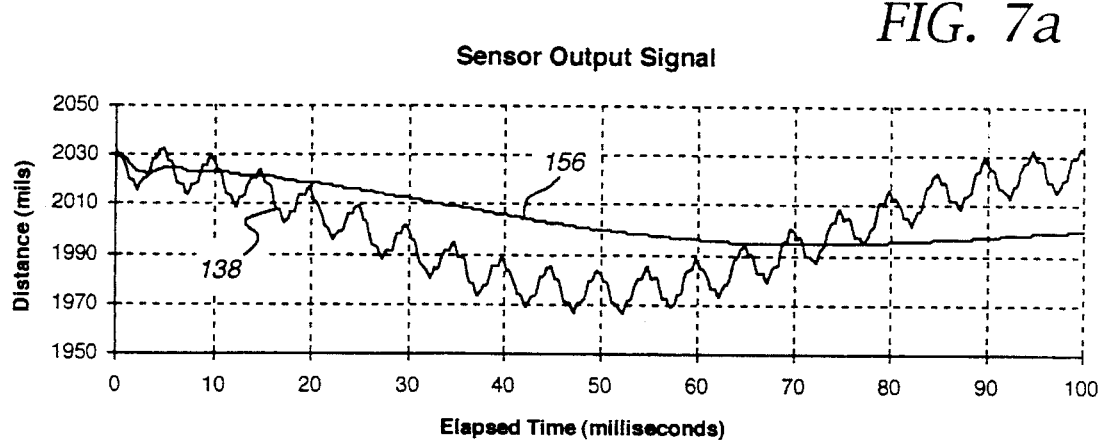
FIGS. 7a to 7i are graphs illustrating the use of phase-locking to determine the amplitude of a signal component of known frequency (i.e. the flute-ridge frequency).
Figure 7B:
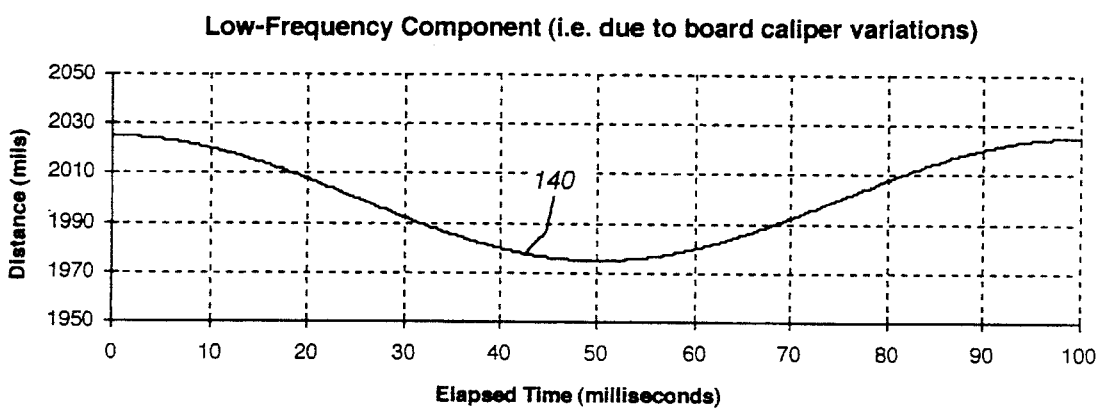
Figure 7C:
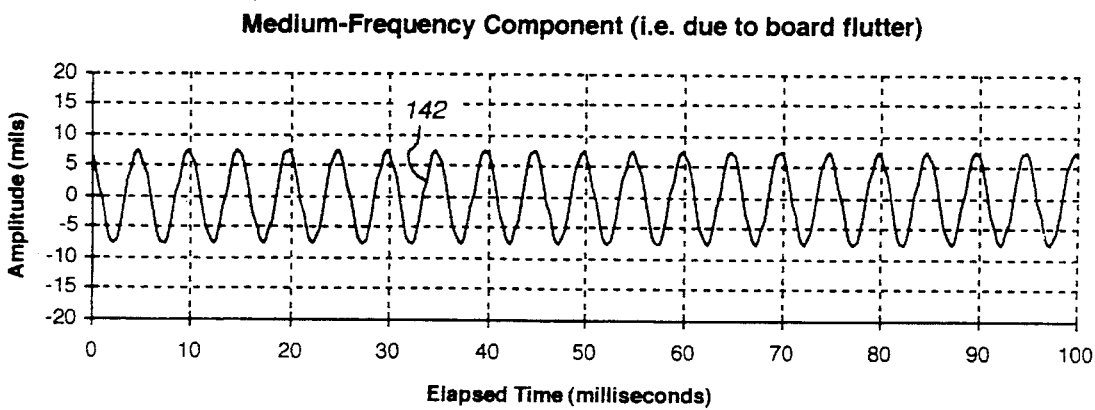
Figure 7D:
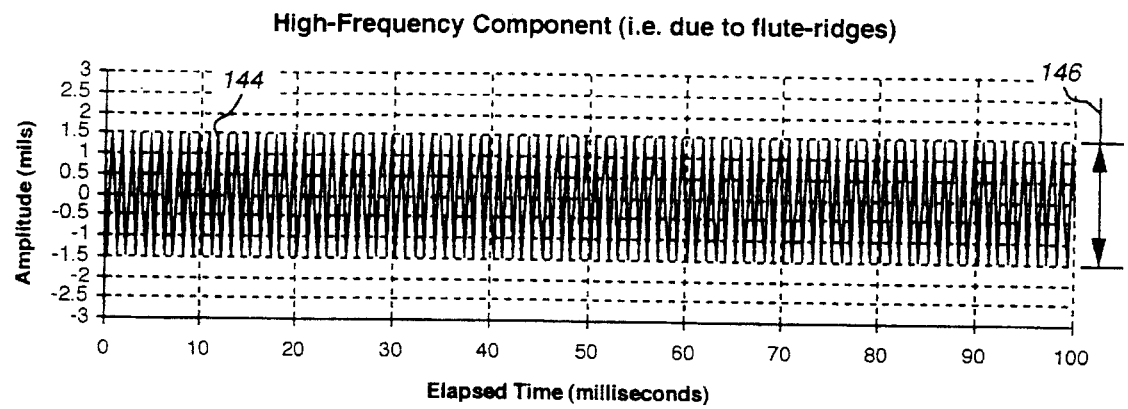
Figure 7E:
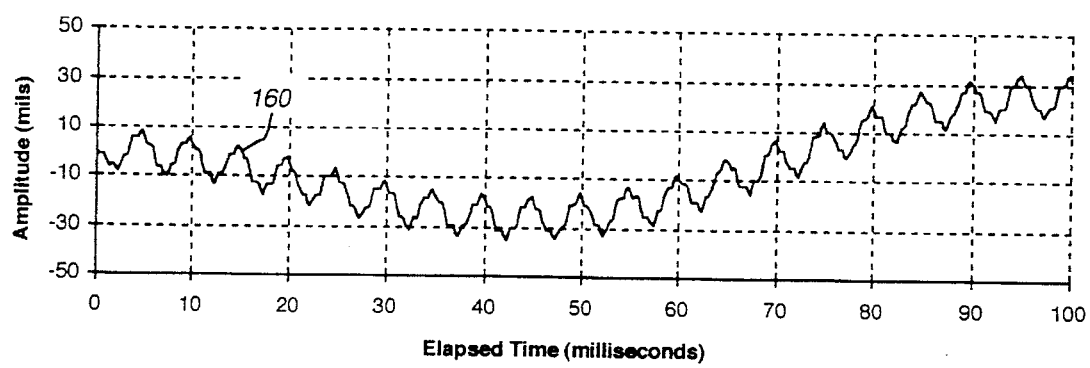
Figure 7F:
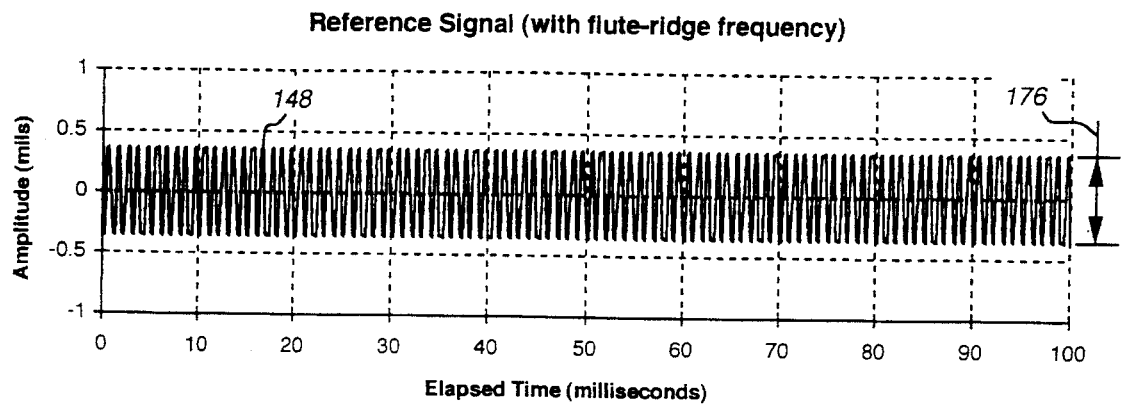

A suitable implementation of the phase-locking procedure will now be described. In step 150 the sensor output signal 138 is sampled at a suitably rapid rate (e.g. 10 kHz) to produce digitized signal samples 154. A simple way to control the rate at which the sensor output signal 138 is sampled is to use a clock pulse 139 (that has a configurable pulse period "^1dt") to initiate the sampling task with every new clock pulse 139. Then, every time a new sample 154 is generated, step 152 averages the last "N" signal samples 154 to develop an updated, running average value 156 (FIG. 7*a*). The quantity "N" used in step 152 is a configurable variable, such that the product of "N" and "^1dt" is typically greater than the period of the longest frequency component 140 of the sensor output signal 138. Step 158 then subtracts each updated running average value 156 from each new signal sample 154 to obtain the difference between each new signal sample 154 and the updated running average 156, with each successive value 160 generated by this step 158 being referred to as a new delta value 160 (FIG. 7*e*). While steps 152 and 158 are not absolutely necessary, they serve to normalize the data to remove the majority of the DC component of the sensor output signal 138, which must otherwise be filtered-out by alternate methods later in the analysis.

In step 162, each new delta value 160 is then multiplied by the time-dependent value "$r_1(t)$" 164 of a calculated reference signal 148 to generate an amplified value 174. The time-dependent value "$r_1(t)$" 164 of the calculated reference signal 148 is determined in step 166 using a suitable trigonometric relationship, such that "$r_1(t)$" is a function of time "T" (the elapsed time since the phase-locking procedure was initiated), the known fluting roll tooth pitch 168, the monitored machine speed 170, and an arbitrary amplitude "A". The clock pulse 139 is also used in step 166 to ensure that each new calculated value 164 is synchronized with each new, concurrent sample 154 of the sensor output signal 138. A suitable trigonometric relationship for calculating the value "$r_1(t)$" 164 of the reference signal 148 is;

$$r_1(t) = (A/2) \times \cos(^\wedge 1w \times T),$$

where ^1w=flute-ridge frequency =machine speed divided by flute pitch

The purpose of step 162 is to amplify that component of the sensor output signal 138 that is synchronized with the calculated reference signal 148, and to filter-out those components of the sensor output signal 138 that have different frequencies than the calculated reference signal 148.

Figure 7G:
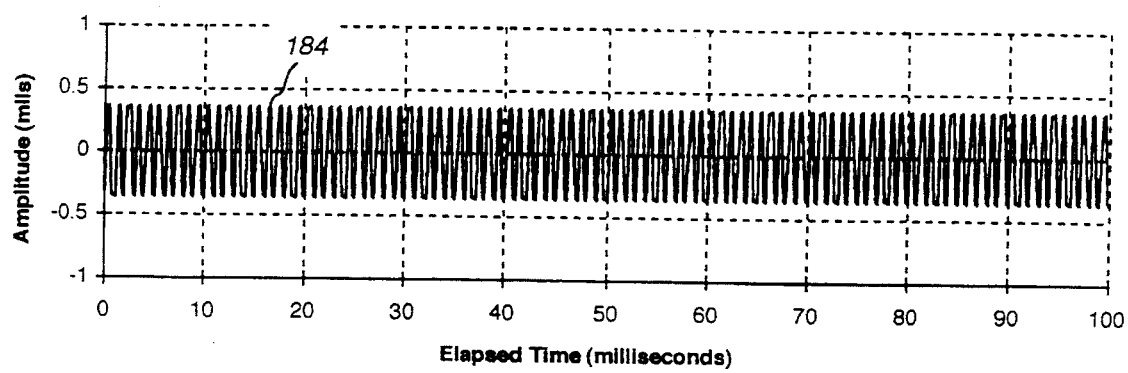
Figure 7H:
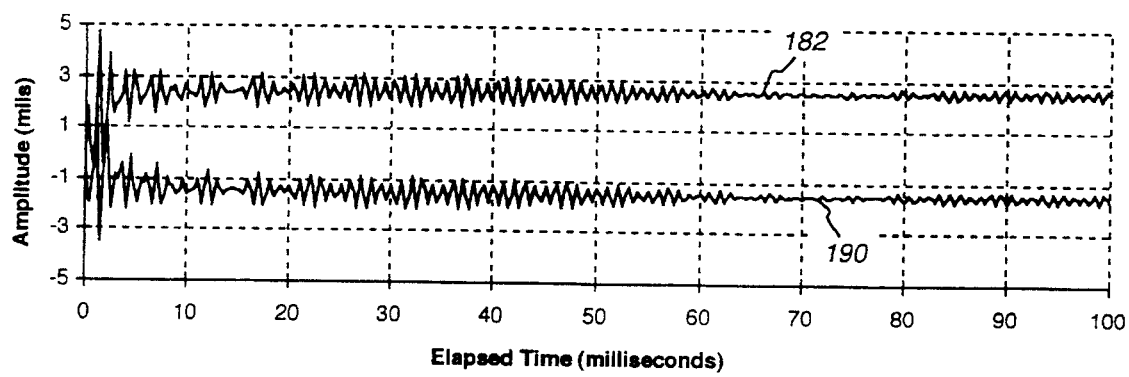
Figure 7I:
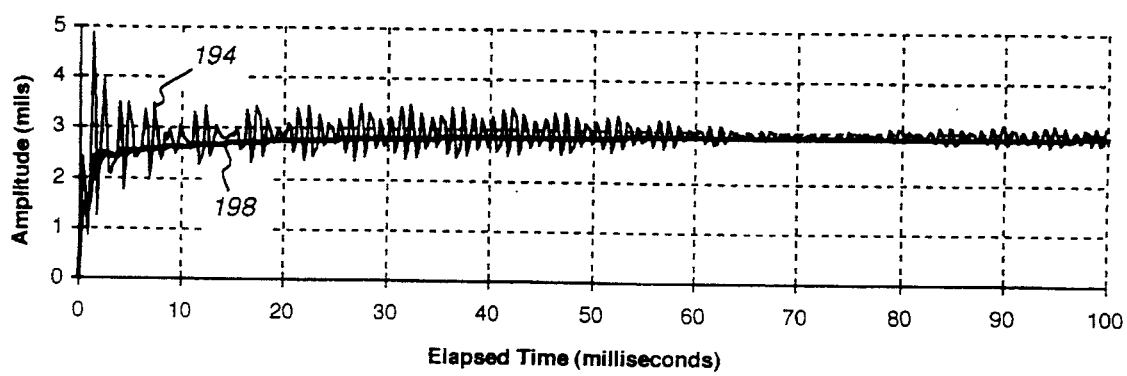

Each new amplified value 174 is then scaled in step 172. Scaling of each new amplified value 174 in step 172 involves dividing each new amplified value 174 by one half of the known amplitude 176 (defined here as the peak-to-valley value, and equal to "A") of the reference signal 148, and then multiplying the result by four (4). Each resultant treated value 178 is then further processed in step 180. In step 180 the last "I" treated values are averaged to develop a running average value 182 (FIG. 7*h*). The quantity "I" used in step 180 is a configurable variable, such that the product of "I" and "^1dt" is typically greater than the period of the longest frequency component 140 of the sensor output signal 138. Step 180 acts as a filter to isolate that component 144 of the sensor output signal 138 that has a frequency equal to that of the reference signal 148.

To account for the likely possibility that in a realistic application the reference signal 148 is somewhat out of phase with the flute-ridge component 144 of the sensor output signal 138, a parallel sequence repeats the functions performed in steps 166, 162, 172 and 180. This parallel sequence begins with step 186, which determines the concurrent, time-dependent value "$r_2(t)$" of a second calculated reference signal 184 (FIG. 7*g*). The second calculated reference signal 184 has a frequency "^1w" and amplitude "A" equal to those of the first calculated reference signal 148, but is ninety (90) degrees out of phase with the first reference signal 148. A suitable trigonometric relationship for calculating the value "$r_2(t)$" 164 of the second reference signal 148 would be;

$$r_2(t) = (A/2) \times \cos[(^\wedge 1w \times T) + (^\wedge 1P/2)]$$

Steps 163, 173 and 181 perform the same functions as steps 162, 172 and 180 respectively. The result of this parallel sequence is ultimately a second stream of treated values 188 and running average values 190 (FIG. 7*h*).

In step 192 the root-sum-square (i.e. the RSS, or square-root of the sum of the squares) of the running average values 182 and 190 is calculated, to produce an RSS value 194 (FIG. 7*i*) which is a phase-independent measurement of the flute-ridge amplitude 146. The final step 196 then averages the last "J" RSS values 194 to develop a running average 198 (FIG. 7*i*) that is the final value produced by the flute-ridge measurement procedure. The quantity "J" used in step 196 is a configurable variable, such that the product of "J" and "^1dt" is typically greater than the period of the longest frequency component 140 of the sensor output signal 138.

It should be noted that some of the steps described above are optional. While steps 180 and 181 are necessary, steps 152, 158 and 196 are not critical. Essentially, the degree of data averaging that is required (i.e. the number of averaging steps, as well as the number of samples in a running average), depends on the noise level of the original sensor output signal 138, and the desired response time of the measurement (i.e. how fast the measurement processing routine should be able to recognize a meaningful change in the flute-ridge amplitude 146).

Referring again to FIG. 5, a particularly suitable laser triangulation sensor for the measurement of flute-ridge amplitudes 124 or 126 is the model LTS 15/3 sensor supplied by TPA Systems b.v., of Maastricht, The Netherlands. This particular sensor has a standard measurement frequency (i.e. measurement update rate) of 100 kHz (and can be designed to provide a measurement frequency of up to 500 kHz), a resolution of 0.2 microns (equivalent to 0.00787 mils, or 7.87×10$^{-3}$ inches), and an accuracy of better than+/–2 microns (equivalent to +/–0.0787 mils, or 78.7×10$^{-3}$ inches). In an application with a flute-ridge frequency of 1000 Hz (based on a 0.2 inch glue-line interval, and 1000 feet/minute machine speed), the standard version of this particular sensor will obtain 100 independent measurements per glue-line interval 136, which is more than sufficient to determine the amplitudes 124, 126 of the flute-ridges 132, 134. In addition, with a resolution of 0.2 microns, this particular sensor will resolve the flute-ridge amplitudes 124 or 126 (peak-to-valley value), which are usually between 1 and 5 mils (i.e. 0.001 to 0.006 inches, or 25.4 to 127 microns) on a typical corrugated board 24, into well over one hundred parts, which will provide more than adequate precision. The +/–2 microns specified accuracy of the sensor will also measure the flute-ridge amplitudes 124, 126 with an accuracy of better than about +/–8%.

Figure 8:
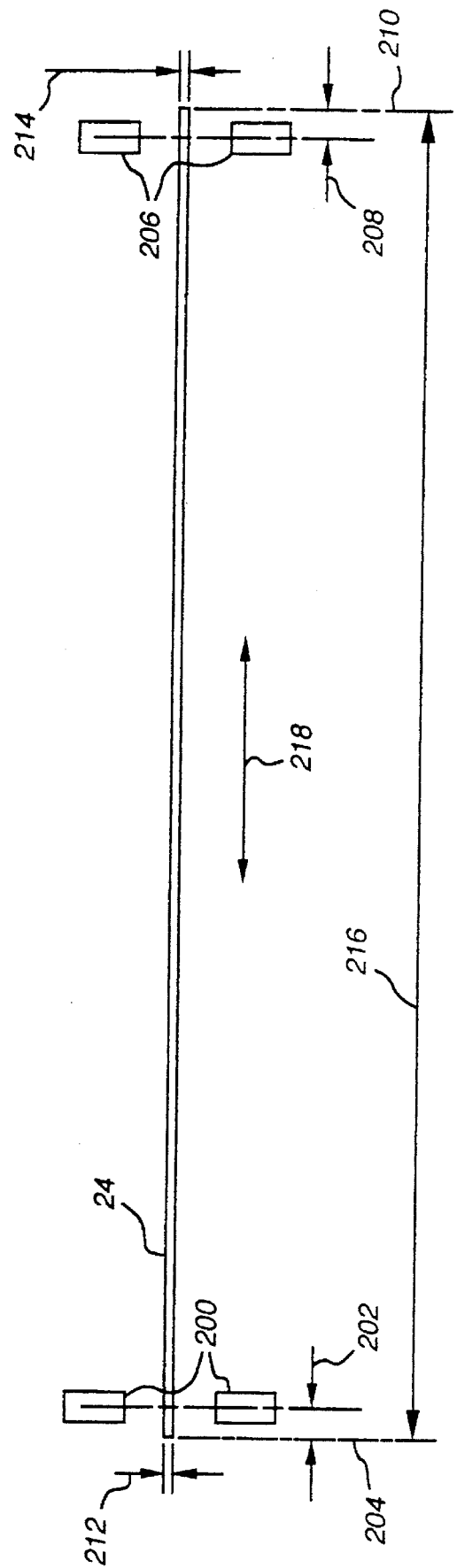
FIG. 8 is an elevational view of a full-width corrugated board, illustrating a pair of sensors of the apparatus of the present invention located near each outer edge of the board.

Referring now to FIG. 8, one pair of sensors 200 may be located a suitable distance 202 (about 1 to 3 inches) from the left edge 204 of the corrugated board 24, and a second pair 206 may be located a similar distance 208 from the right edge 210 of the board 24. When the board 24 is measured close to both edges 204, 210, the measurements from each sensor pair 200, 206 are first individually processed as described above, then as an additional function, left and right-edge measurements (for caliper and flute-ridge amplitude), such as for left-edge caliper 212 and right-edge caliper 214, are averaged to produced a mean value for the board's full width 216, as well as subtracted from one another to determine the gradient in the cross-machine direction 218.

The apparatus could also be applied in a scanning mode to provide full-width measurement of flute-ridge amplitude. In a scanning mode a pair of sensors, one located above the board and one located below the board adjacent to the first, would be attached to a traversing carriage which is driven back and forth across the width of the board by a suitable device (such as a motor-driven belt). In this arrangement each sensor would determine the mean flute-ridge amplitude for a time-increment that equates to the passage of a given cross-machine segment of the board. The sensor pair would traverse the board along a path that is exactly perpendicular to the machine direction, so its traversing speed would not affect the nature or accuracy of the sensor output signal filtering technique that has been previously described (because the speed with which flutes pass by the sensor would not be affected by the traversing speed). In addition, with a flute-ridge frequency of 500 to 1,000 Hz, and a typical sensor traversing speed of six inches per second, typically 500 to 1,000 flutes would pass by each sensor during traverse of a six inch width. Passage of 500 to 1,000 flutes would facilitate the determination of a new flute-ridge amplitude, hence a new flute-ridge amplitude could be calculated for each new six inch width.

However, because flute-ridge amplitude does not vary appreciably from point to point across a board's width, a scanning implementation is not deemed advantageous. In addition, as a scanning implementation would be unable to detect localized flaws, an arrangement consisting of multiple, fixed, sensor pairs is preferred.

While the foregoing invention has been described with reference to its preferred embodiments, various alterations and modifications will occur to those skilled in the art. All such alterations and modifications are intended to fall within the scope of the appended claims.

What is claimed is:

1. An apparatus for the measurement of at least two characteristics of corrugated board, said apparatus comprising:

at least one pair of laser triangulation sensors, one of said sensors being located on one side of the board while the board is being manufactured or treated and the second sensor of said pair of sensors being located on an opposite side of said board, each of said laser triangulation sensors including:

a laser diode for projecting a modulated laser beam onto the surface of the corrugated board;

means for focusing light reflected off a surface of said corrugated board into a light spot;

a position sensitive detector which receives said focused light spot and provides an output signal indicative of the position of said light spot;

means for converting said output signal into dimensional information describing the distance between said sensor and the surface of said corrugated board;

means for converting said dimensional information into at least two characteristics of said corrugated board.

2. The apparatus for the measurement of at least two characteristics of corrugated board of claim 1 wherein said means for converting said output signal into dimensional information comprises:

means for summing the distance between one surface of the board and its adjacent sensor and the distance between a second surface and its adjacent sensor;

means for subtracting said sum from the distance between said two sensors of said pair of sensors to derive the caliper of the board.

3. The apparatus for the measurement of at least two characteristics of corrugated board of claim 1 wherein said means for converting said dimensional information comprises:

means for establishing upper and lower thresholds of board caliper;

means for continuously measuring the caliper of said board as said board travels past said sensors;

means for determining whether said measured caliper exceeds said upper or lower threshold;

means for recording a beginning of a board flaw upon the occurrence of a said measured caliper exceeding said threshold;

means for recording an end of a board flaw upon said measured caliper falling between said upper and lower thresholds.

4. The apparatus for the measurement of at least two characteristics of corrugated board of claim 1 wherein said means for converting said output signal comprises means for converting said output signal into measurements of the amplitude of repetitive, high frequency displacements of the surface of said board, and wherein said means for converting said dimensional information comprises a narrow band-pass filter for isolating a flute-ridge amplitude from said measurements of the board position.

5. The apparatus for the measurement of at least two characteristics of corrugated board of claim 1 wherein one pair of said sensors is located in the apparatus so that one edge of said board passes between said two sensors of said one pair and a second pair of said sensors is located in said apparatus so that an edge of said board opposite said one edge passes between said two sensors of said second pair.

6. An apparatus for detecting flaws in corrugated board, said apparatus comprising:

at least one pair of position sensors, one of said sensors being located on one side of the board while the board is being manufactured or treated and the second sensor of said pair of sensors being located on an opposite side of said board, each of said position sensors producing an output signal indicative of a relative position of a surface of the board;

means for converting said output signal into dimensional information describing a distance between said sensor and the surface of said corrugated board;

means for comparing said distance to predetermined threshold levels for said distance which represent a flaw in the board.

7. The apparatus for detecting flaws in corrugated board of claim 6 wherein said one pair of position sensors comprises at least one pair of laser triangulation sensors, each of said laser triangulation sensors including:

a laser diode for projecting a modulated laser beam onto the surface of the corrugated board;

means for focusing light reflected off a surface of said corrugated board into a light spot;

a position sensitive detector which receives said focused light spot and provides said output signal indicative of the position of said light spot.

8. The apparatus for detecting flaws in corrugated board of claim 6 further comprising means for monitoring continuous deviations from said threshold levels to determine the length of said board flaw in a machine direction.

9. An apparatus for measuring the amplitude of flute ridges on a surface of a corrugated board, said apparatus comprising:

one sensor located so that one surface of the corrugated board passes by said sensor, said sensor producing an output signal indicative of a relative position of a surface of the board;

means for converting said output signal into dimensional information describing a distance between said sensor and the surface of said corrugated board;

means for differentiating random variations in said distance caused by factors other than flute ridges from said flute ridges.

10. The apparatus for measuring flute ridge amplitude of claim 9 wherein said sensor comprises a laser triangulation sensor, said laser triangulation sensor including:

a laser diode for projecting a modulated laser beam onto the surface of the corrugated board;

means for focusing light reflected off a surface of said corrugated board into a light spot;

a position sensitive detector which receives said focused light spot and provides said output signal indicative of the position of said light spot.

11. The apparatus for measuring flute ridge amplitude of claim 9 wherein said means for differentiating random variations in said distance comprises means for band pass filtering said output signal to isolate components of said output signal that are fluctuating at the flute-ridge frequency.

12. A method for measuring at least two characteristics of corrugated board, said method comprising the steps of:

positioning at least one pair of laser triangulation sensors such that one of said sensors is located on one side of the board while the board is being manufactured or treated and the second sensor of said pair of sensors is located on an opposite side of said board;

projecting a modulated laser beam onto the surface of the corrugated board;

focusing light reflected off a surface of said corrugated board into a light spot;

generating an output signal indicative of the position of said light spot;

converting said output signal into dimensional information describing the distance between said sensor and the surface of said corrugated board;

converting said dimensional information into at least two characteristics of said corrugated board.

13. The method for measuring at least two characteristics of corrugated board of claim 12 wherein said step of converting said output signal into dimensional information comprises the steps of:

summing the distance between one surface of the board and its adjacent sensor and the distance between a second surface and its adjacent sensor;

subtracting said sum from the distance between said two sensors of said pair of sensors to derive the caliper of the board.

14. The method for measuring at least two characteristics of corrugated board of claim 12 wherein said step of converting said dimensional information comprises the steps of:

establishing upper and lower thresholds of board caliper;

continuously measuring the caliper of said board as said board travels past said sensors;

determining whether said measured caliper exceeds said upper or lower threshold;

recording a beginning of a board flaw upon the occurrence of a said measured caliper exceeding said threshold;

recording an end of a board flaw upon said measured caliper falling between said upper and lower thresholds.

15. The method for measuring at least two characteristics of corrugated board of claim 12 wherein said step of converting said Output signal comprises the step of converting said output signal into measurements of the amplitude of repetitive, high frequency displacements of the surface of said board and wherein said step of converting said dimensional information comprises the step of narrow band-pass filtering said output signal to isolate a flute-ridge amplitude from said measurements of the amplitude of said high frequency displacements.

* * * * *